United States Patent [19]

Zhong et al.

[11] Patent Number: 5,912,312

[45] Date of Patent: Jun. 15, 1999

[54] HOMOGENEOUS COPOLYMERS CONTAINING VINYL PYRROLIDONE AND 2-METHYLENE-1,3-DIOXEPANE AND PROCESS FOR MAKING SAME

[75] Inventors: Yuanzhen Zhong, Wayne; Philip F. Wolf, Bridgewater; Edward G. Malawer; Kolazi S. Narayanan, both of Wayne, all of N.J.

[73] Assignee: ISP Investments Inc., Wilmington, Del.

[21] Appl. No.: 09/071,841

[22] Filed: May 1, 1998

[51] Int. Cl.$^6$ ...................................................... C08F 26/08
[52] U.S. Cl. .............................................................. 526/263
[58] Field of Search ............................................... 526/263

[56] References Cited

U.S. PATENT DOCUMENTS

| | | | |
|---|---|---|---|
| 4,806,609 | 2/1989 | Tracy et al. | 526/263 |
| 5,304,317 | 4/1994 | Barwise et al. | 526/263 |

OTHER PUBLICATIONS

Answer 1 of 9—1998:431352 Doc. No. 129:109369—Pan et al Univ. of Beijing China—381–384—Abstract pp. 6–7.

*Primary Examiner*—Bernard Lipman
*Assistant Examiner*—N. Sarofim
*Attorney, Agent, or Firm*—William J. Davis; Walter Katz; Marilyn J. Maue

[57] ABSTRACT

Homogeneous copolymers of 60–99 mole % of vinyl pyrrolidone (VP) and 1–40 mole % 2-methylene-1,3-dioxepane (MDO), preferably 85–95 mole % VP and 5–10 mole % MDO, having a K-value of about 30–50, and a Tg of about 124–138° C., are described herein. The copolymers are hydrolytically degradable in aqueous acid or basic solutions and biodegradable.

9 Claims, No Drawings

HOMOGENEOUS COPOLYMERS CONTAINING VINYL PYRROLIDONE AND 2-METHYLENE-1,3-DIOXEPANE AND PROCESS FOR MAKING SAME

BACKGROUND OF THE INVENTION

1. Field of the Invention

This invention relates to degradable polymers, and, more particularly, to homogeneous copolymers containing vinyl pyrrolidone (VP) and 2-methylene-1,3-dioxepane (MDO), of defined composition and molecular weight, and to solution and precipitation polymerization processes for making such copolymers.

2. Description of the Prior Art

M. Shtilman et al, in a paper entitled "Biodegradable Polymers of N-Vinyl Pyrrolidone as Potential Carriers for Pharmaceuticals" in the Proceed. Inter. Sump/Control/Rel. Gioact Mater. 21 (1994); Controlled Release Society, IN., pp 746–7, mentioned that copolymers of vinyl pyrrolidone with 2-methylene-1,3-dioxepane would be biodegradable. However, no method of preparation for such copolymers was disclosed although monomer reactivity ratios and IR spectra of the copolymer product were given. Scheme 1 in the paper indicated that the "Reaction of 2-Methylene 1,3-Dioxepane with NVP" proceeded as follows:

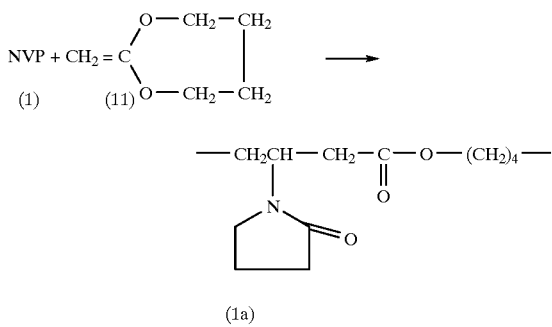

The equation was schematic for a 1:1 NVP:MDO (50 mole % VP:50 mole % BMO) copolymer only, and no evidence of biodegradability of such a copolymer was disclosed.

Accordingly, it is an object of this invention to provide copolymers of VP and MDO in defined compositional ranges, molecular weights and Tg values, and to processes for making such copolymers having advantageous properties.

Another object is to provide homogeneous copolymers of VP and MDO in a compositional range of 80–99 mole % and about 1–40 mole % MDO; preferably 85–95 mole % VP and 5–15 mole % MDO, at a K-value of about 30–50, preferably 35–45, and a Tg of about 124–138° C.

Still another object herein is to provide processes for making said homogeneous copolymers of VP and MDO in said composition range and with such advantageous properties.

Another object is to provide a solution polymerization process in isopropyl alcohol as solvent using a free radical initiator to prepare homogeneous copolymers of VP and MDO in the desired compositional range having advantageous physical properties.

Another object is to provide a precipitation polymerization process in heptane solvent with a suitable free radical initiator to prepare homogeneous copolymers of VP and MDO in the desired compositional range.

Among the other objects of the invention is to provide homogeneous copolymers of 60–99 mole t VP and 1–40 mole % MDO, preferably 85–95 mole % VP and 5–15 mole % MDO, which is hydrolytically degradable in aqueous basic or acid solutions.

These and other objects and features of the invention will be made apparent from the following more particular description thereof.

SUMMARY OF THE INVENTION

What is described herein are homogeneous copolymers having a composition of about 60–99 mole % of vinyl pyrrolidone (VP) and about 1–40 mole % of 2-methylene-1,3-dioxepane (MDO), with a K-value of about 30–50 and a Tg of about 124–138° C. Preferred are homogeneous copolymers wherein VP is 85–95 mole % and MDO is 5–15 mole % and the K-value is about 35–45.

The homogeneous copolymers of the invention are made by solution or precipitation polymerization of VP and MDO monomers in a suitable solvent in the presence of a free radical initiator. Such solvents include isopropanol (solution polymerization) or heptane (precipitation polymerization). Generally, substantially more MDO is added upfront while substantially more VP is added slowly or continuously to the charged MDO.

The polymers of the invention are hydrolytically degradable in aqueous acid or basic solutions and biodegradable.

DETAILED DESCRIPTION OF THE INVENTION

In accordance with the present invention, there are provided homogeneous copolymers of vinyl pyrrolidone and 2-methylene-1,3-dioxepane, optionally with other comonomers, in which the VP is present in a mole concentration of about 60–99%, preferably 85–95%, and MDO is present in an amount of about 1–40 mole %, preferably 5–15 mole %. Since the molecular weights of VP (111) and MDO (114) monomers are practically the same, the mole percentages indicatd are substantially equal to weight percentages for each monomer.

A suitable method for making such homogeneous copolymers is to polymerize such monomers in a suitable solvent in the presence of a free radical initiator. One such process is solution polymerization in a solvent e.g. a $C_1$ to $C_3$ alcohol, in which both monomers and the copolymer are soluble. A preferred solution polymerization solvent is isopropyl alcohol.

Suitable initiators include acyl peroxides such as diacetyl peroxide, dibenzoyl peroxide and tert-butyl peroxy-2-ethylhexanoate; peroxides such as di-tert-butyl peroxide; percarbonates such as dicyclohexyl peroxydicarbonate; and azo compounds such as 2,2'-azobis(isobutyronitrile), 2,2'-azobis(2,4-dimethylvaleronitrile), 1,1'-azobis(cyanocyclohexane) and 2,2'-azobis (methylbutyronitrile). Other initiators known in the art also may be used. A preferred free radical initiator is Vazo® 67 (duPont) which is [2,2-azobis(2-methylbutane-nitrile].

The Q, e values and reactivity ratios of monomers in copolymerization have the relation in the forms $$r_1 = \frac{Q_1}{Q_2} \exp[-e_1(e_1 - e_2)]$$

$$r_2 = \frac{Q_2}{Q_1} \exp[-e_2(e_2 - e_1)]$$

Literature (W. J. Bailey, ACS Symposium Series 433, Agricultural and Synthetic Polymer, Chapter 13, p. 152) gave the reactivity ratios of MDO and styrene. Routine polymer textbook (e.g. G. Odian, Principles of Polymerization, $3^{rd}$ ed., p. 482) gave the Q, e values of styrene.

|  | Reactivity Ratios | | Q, e values | |
| --- | --- | --- | --- | --- |
|  | $r_1$ | $r_2$ | Q | e |
| Styrene | 23.6 |  | 1.00 | −0.80 |
| MDO |  | 0.021 |  |  |

From the above data and formulas, the Q, e values of MDO could be calculated.

From the Q and e values of VP and MDO monomers, the reactivity ratios, $r_1$ and $r_2$ of the monomers can be calculated as follows:

| Comonomer Reactivity Ratios Calculated from Q/e values | | |
| --- | --- | --- |
|  | $r_1$ | $r_2$ |
| VP | 1.941 |  |
| MDO |  | 0.414 |

These results indicate that VP is substantially more reactive than MDO during the copolymerization reaction. The reaction is carried out with an upfront charge of a substantial amount or all of the MDO monomer and a slow, continuous feed of VP in a reactor precharged with MDO and free radical initiator.

Typically, the copolymerization reaction is carried out at a monomer concentration of about 30%–90%, preferably 70% solids and at 60° C.–120° C., preferably 80° C. for about 12 hours. After completion of the polymerization step, the isopropanol solvent was replaced by water by distillation under vacuum at about 55° C. The resultant aqueous solution was diluted to 10–15% solids and freeze-dried to form a powder product.

The precipitation polymerization process was carried out in a solvent which dissolved both monomers but in which the copolymer was insoluble, suitably an organic solvent, such as an aliphatic hydrocarbon solvent, preferably cyclohexane or heptane, or an aromatic hydrocarbon, such as toluene. A suitable free radical initiator is Lupersol® 11 (Atochem) which is available as a 75% solution of the active t-butyl peroxypivalate in 25% of odorless mineral spirits.

The invention will now be described with particular reference to the following examples.

EXAMPLE 1

Solution Polymerization

A. Equipment

A 1-l Buchi reactor with a glass jacket operable up to 12 atm. pressure and 250° C. was equipped with a vent valve on top connected to a pump and a release valve on the bottom for discharge, two thermocouples, one inserted from the top into the reactor, whose tip reached into the interior of the reactor, and the other inserted from the bottom to measure the temperature when only a small amount of material remained in the well of the reactor, an anchor agitator, and a safety vent. Runs 3–8 were carried out in the Buchi reactor.

In other experiments, the reaction flask was a round bottom, 4-necked vessel equipped with a stirrer, a gas inlet for nitrogen and a thermocouple through the same neck, a finger condenser open to the atmosphere for reflux, an inlet for addition of the chemical reactants, and a temperature controlled heating mantle. Runs 1–2 were carried out in this reaction flask.

B. Reaction Conditions

The polymerization reactions were carried out in isopropyl alcohol solvent using Vazo® 67 (0.3t by weight of monomers) as initiator.

Runs 1 and 2 were control runs using VP monomer only.

In Runs 3 and 4 in Table 1, all of the VP and MDO, and Vazo® 67, and all or part of the IPA, were precharged. The monomer/polymer concentration during the runs was 50% (Runs 1–3) and 70% (Run 4). After addition of reaction materials, the temperature was raised to 80° C. and held for 8 hours (Runs 1–3) or for 12 hours (Run 4), followed by cooling and discharge. In Run 4, the rest of the IPA was added at the end of the polymerization to adjust the solids content to 50%.

In Runs 5–8, only part of the monomers, initiator and solvent were precharged. After reaching reaction temperature, the remainder was fed continuously into the reactor through syringe pumps for predetermined periods of time for each. Particularly, MDO was added over a period of 5 hours; VP over 7 hours; Vazo® 67 over 8 hours; and IPA over 8.5 hours. The reaction concentration was 70% and the total reaction time at 80° C. was 12 hours.

After the reaction was complete, the IPA was replaced by water by vacuum distillation at 55° C., and the aqueous solution of the copolymer was diluted to a 10–15% concentration and freeze-dried to form a powder.

The results are shown in Table 1 below:

TABLE 1

Solution Polymerization

| Run | Monomer Composition (moles) | Reaction Concentration (%) | Reactants (g) VP | Reactants (g) MDO | Reactants (g) Vazo® 67 | Reactants (g) IPA | Yield (%) | K-Value of Polymer* | Copolymer Composition (Moles) VP | Copolymer Composition (Moles) MDO |
|---|---|---|---|---|---|---|---|---|---|---|
| 1 | VP | 50 | 80 | — | 0.24 | 80 | 60 | 41.9 (water) 48.3 (EtOH) | 99 | — |
| 2 | VP | 50 | 160 | — | 0.48 | 160 | 83 | 47.4 (IPA) | 100.6 | — |
| 3 | VP/MDO (90:10) | 50 | 102 | 12 | 0.36 | 120 | 76 | 38.1 (IPA) | 94.1 | 5.9 |
| 4 | VP/MDO (90:10) | 70 | 179.51 | 20.49 | 0.60 | 200 | 65 | 41.7 (EtOH) | 91.2 | 8.8 |
| 5 | VP/MDO (90:10) | 70 | | | | | 60 | 44 (powder) | 94.4 | 5.6 |
| 6 | VP/MDO (90:10) | 70 | | | | | 83 | 38.5 (IPA) 40.2 (water) 36.7 (powder) | 87.4 | 12.6 |
| 7 | VP/MDO (95:5) | 70 | | | | | 76 | 43.7 (IPA) 44.5 (water) 42.1 (powder) | 95.3 | 4.7 |
| 8 | VP/MDO (90:10) | 70 | | | | | 65 | 47.9 (IPA) 48.9 (water) 44.8 (powder) | 88.2 | 11.8 |

*The relative viscosity of a 1% solution at 25° C. was used to determine the K-value
Runs 1–4: solvent used is indicated in parenthesis; Runs 5–8: solvent used is ethanol
Runs 1–4 - all reactants and initiator were precharged
Run 5 - reactants and initiator were fed continuously, some VP more slowly
Run 6 - as 5; however VP fed slower
Run 7 - as 6
Run 8 - all MDO precharged; only VP fed

EXAMPLE 2

Precipitation Polymerization

The copolymer was polymerized in heptane using Lupersol® 11 (0.3% by weight of monomers) as initiator. The MDO monomer and heptane solvent were precharged. After raising the temperature to 65° C., the initiator was added through a syringe. Then VP was fed continuously into the reactor through a pump over a period of 7 hours, followed by post-heating to reduce residual monomers for an additional hour at 65° C. before cooling and discharging the copolymer product. The final monomer/copolymer concentration was 50%. The copolymer slurry in heptane then was dried in a vacuum oven at 60° C. for 4 hours and at 80° C. for 24 hours. The copolymer was obtained in powder form. The results are shown in Table 2 below.

TABLE 2

| (moles) | Composition of | | | Composition of Copolymer | |
|---|---|---|---|---|---|
| Run | Monomers | Yield (%) | K-Value | VP | MDO |
| 9 | VP/MDO (90:10) | 78 | 55.4 (EtOH) | 90.1 | 9.9 |
| 10 | VP/MDO (90:10) | 87 | 44.5 (EtOH) | 92.8 | 7.2 |

Runs 9–10 - all MDO precharged; VP fed continuously

EXAMPLE 3

Hydrolytic Degradation of Copolymer

The extent of hydrolytic degradation was determined by measuring the change in pH over time of aqueous solutions of the copolymer. The results are shown in Table 3 below.

TABLE 3

| Run | Polymer | Test Solution | pH (Start) | pH (weeks) 1 | 2 | 3 | 4 |
|---|---|---|---|---|---|---|---|
| 1 | PVP (control) | Acid | 1.14 | 1.04 | 1.05 | 1.05 | 1.14 |
| | | Base | 10.45 | 10.66 | 10.46 | 10.15 | 9.97 |
| | | Neutral | 4.70 | 4.52 | 4.67 | 4.95 | 5.23 |
| 3 | P(VP/MDO)* (90:10) | Acid | 0.98 | 0.88 | 0.89 | 0.86 | 0.93 |
| | | Base | 9.16 | 6.81 | 6.60 | 6.68 | 6.64 |
| | | Neutral | 5.36 | 5.03 | 4.80 | 4.62 | 4.37 |
| 4 | P(VP/MDO)** (90:10) | Acid | 1.06 | 0.95 | 0.97 | 0.96 | 1.05 |
| | | Base | 9.15 | 6.84 | 6.67 | 6.58 | 6.47 |
| | | Neutral | 4.54 | 4.23 | 4.81 | 4.13 | 4.09 |

*MW = 50,400 amu
**MW = 54,200 amu

EXAMPLE 4

The corresponding changes in weight average molecular weight, Mw, of the solutions tested in Example 3 are given in Table 4 below.

TABLE 4

| Run | Copolymer | Mw (amu) Initial | 1 wk | 2 wks | 4 wks | Initial pH Conditions |
|---|---|---|---|---|---|---|
| 1 | PVP (control) | 64,100 | | 60,100 | 58,100 | 2 |
| | | 64,100 | | 65,000 | 64,900 | 11 |
| | | 64,100 | | 56,900 | 56,300 | 7 |
| 2 | PVP (control) | 66,800 | | 63,300 | 61,100 | 2 |
| | | 66,800 | | 66,300 | 67,500 | 11 |
| | | 66,800 | | 63,600 | 62,500 | 7 |
| 3 | P(VP/MDO) (90:10) | 50,400 | | 11,800 | 11,600 | 2 |
| | | 50,400 | | 33,800 | 33,200 | 11 |
| | | 50,400 | | 46,600 | 46,200 | 7 |

TABLE 4-continued

| Run | Copolymer | Initial | Mw (amu) 1 wk | 2 wks | 4 wks | Initial pH Conditions |
|---|---|---|---|---|---|---|
| 4 | P(VP/MDO) (90:10) | 54,200 | | 11,700 | 11,500 | 2 |
| | | 54,200 | | 29,800 | 30,000 | 11 |
| | | 54,200 | | 55,100 | 52,600 | 7 |
| 5 | P(VP/MDO) (90:10) | 97,500 | 40,600 | 26,950 | | 2 |
| | | 97,500 | 11,150 | 10,350 | | 11 |
| | | 97,500 | 91,450 | 87,750 | | 7 |
| 9 | P(VP/MDO) (90:10) | 174,000 | 29,000 | 27,200 | 25,000 | 11 |
| | | 174,000 | 185,500 | 182,000 | 169,000 | 7 |
| 10 | P(VP/MDO) (90:10) | 93,000 | 49,000 | 36,000 | 255,000 | 2 |
| | | 93,000 | 41,000 | 37,500 | 33,000 | 11 |
| | | 93,000 | 136,000 | 132,500 | 127,600 | 7 |

The results of these tests demonstrate that the copolymer of the invention degrade hydrolytically in acid and base solutions. In basic solution, the pH dropped appreciably, because hydrolysis of the ester group on the backbone of the copolymer generated oligomers capped with a hydroxyl group on one end and a carboxylic acid group on the other. In both acidic and basic solutions, the degradation resulted in a decrease in Mw and rate of decrease increased with the Mw of the copolymer.

The polymers of the invention are used in commercial applications where hydrolytic and biodegradability is an important requirement. Accordingly, these polymers are particularly advantageous as binders in such products as fish feed. The copolymer also is useful as a dispersant in systems where PVP itself has been the conventional polymer of choice.

While homogeneous copolymers of VP and MDO have been disclosed particularly herein, one or more comonomers may be included in the system, for example, such monomers as vinyl acetate, vinyl caprolactam, an alpha-olefin, maleic anhydride, vinyl ether, dimethylaminoethyl/methacrylate and dimethylamino ethyl/methacrylamide may form part of the polymer system.

While the invention has been described with particular reference to certain embodiments thereof, it will be understood that changes and modifications may be made which are within the skill of the art. Accordingly, it is intended to be bound only by the following claims.

What is claimed is:

1. Homogeneous copolymers having a composition of about 60–99 mole % of vinyl pyrrolidone (VP) and about 1–40 mole % of 2-methylene-1,3-dioxepane (MDO), a K-value of about 30–50 and a Tg of about 124–138° C.

2. Homogeneous copolymers according to claim 1 wherein VP is 85–95 mole %, MDO is 5–15 mole % and the K-value is about 35–45.

3. Homogeneous copolymers according to claim 1 which are made by copolymerization of VP and MDO monomers in a solvent in the presence of a free radical initiator.

4. Homogeneous copolymers made according to the process of claim 3 wherein the solvent is a $C_1$–$C_3$ alcohol, or a hydrocarbon.

5. Homogeneous copolymers made according to the process of claim 3 wherein substantially more MDO is added upfront while substantially more VP is added slowly or continuously to the MDO.

6. Homogeneous copolymers according to claim 1 which are made by solution polymerization in a $C_1$–$C_3$ alcohol.

7. Homogeneous copolymers according to claim 1 which are made by precipitation polymerization in a hydrocarbon solvent.

8. Homogeneous copolymers according to claims 1–7 which includes one or more comonomers therein.

9. Homogeneous copolymers according to claim 8 wherein said comonomers are selected from vinyl acetate, vinyl caprolactam, an alpha-olefin, maleic anhydride, vinyl ether, dimethylamino ethyl methacrylate, and dimethylamino ethyl methacrylamide.

* * * * *